Oct. 31, 1944.   T. F. STACY   2,361,432
MATERIAL MEASURING AND DELIVERING MECHANISM
Filed Oct. 17, 1941   2 Sheets-Sheet 1

INVENTOR
Thomas F. Stacy
BY
Parker, Prockrow & Farmer.
ATTORNEYS

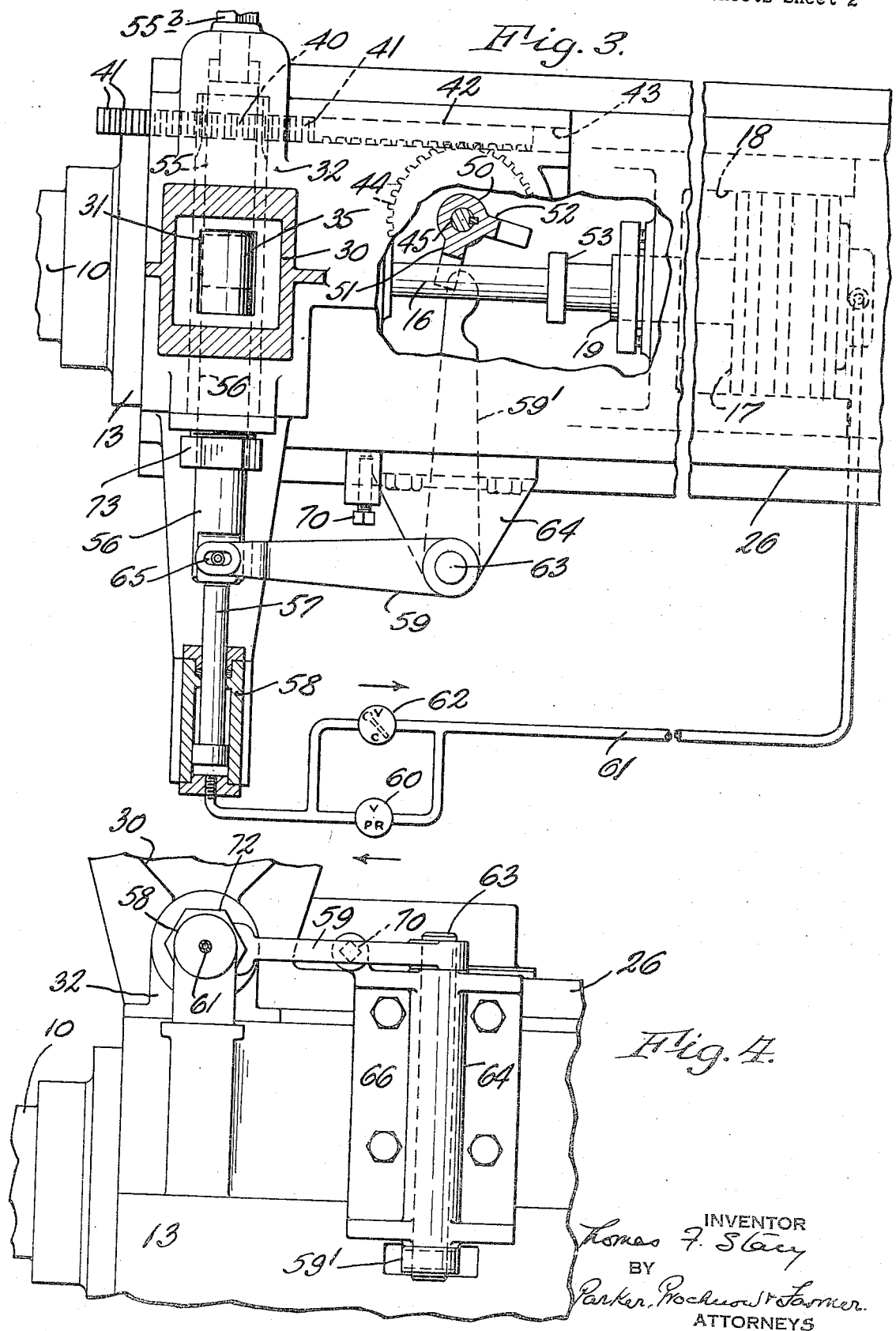

Patented Oct. 31, 1944

2,361,432

UNITED STATES PATENT OFFICE 2,361,432

MATERIAL MEASURING AND DELIVERING MECHANISM

Thomas F. Stacy, Piqua, Ohio, assignor to The French Oil Mill Machinery Company, Piqua, Ohio Application October 17, 1941, Serial No. 415,478

16 Claims. (Cl. 18—30)

This invention relates to material measuring and delivering mechanisms and methods and more particularly to improvements in the charge-measuring means of injection molding apparatus of that kind in which loose or divided solid material is delivered in successive measured charges to a device which heats and converts the material to a fluid or liquid condition and from which the liquefied material is injected into the mold or molds. Injection molding apparatus are known in which a measuring device delivers measured charges of the divided material into a plunger chamber in which an injection plunger is reciprocated by hydraulic means for injecting successive charges into the heating device and thereby forcing successive forward strokes of the plunger.

In injection molding apparatus of such type, it is a desideratum that just the correct volume or amount of material to properly fill the mold shall be injected into the mold at each operative stroke of the injection plunger in order to prevent, on the one hand, an insufficient volume of material in the mold to form a perfect molded article, and on the other hand, to prevent waste of the material by delivering an excess amount to the mold. If, in the operation of the apparatus, an undercharge of material is delivered to the injection plunger chamber, a given length of the stroke of the plunger will not inject the requisite volume into the mold to properly fill it, whereas if an overcharge is introduced into the plunger chamber, the plunger will not complete its normal stroke and if there are repeated overcharges the plunger stroke will become shorter and shorter until the chamber can no longer be charged from the measuring device. Unless such under or overcharges are compensated for by increasing or decreasing the volume of succeeding charges, there will be an accumulation of errors with resulting inefficient operation of the apparatus.

One object of this invention is to provide practical and efficient means which will avoid such objectionable result and automatically vary or regulate the volumes of the charges so as to insure the injection of charges of correct volume into the mold.

Other objects of the invention are to provide improved charge-measuring means whereby the volume of each charge of material delivered to the injection plunger chamber will be automatically predetermined by the volume of a previous charge so as to compensate for a preceding undercharge or overcharge; and in which the volumes of the charges delivered to the injection plunger will be automatically adjusted or varied in accordance with variations in the injection strokes of the plunger; and to provide an improved method of measuring charges of molding material.

Further objects and advantages of the invention will appear from the following specification of the preferred embodiment of the invention, shown in the accompanying drawings, and the novel features of the invention are set forth in the appended claims.

In said drawings:

Fig. 3 is a fragmentary plan view, partly in horizontal section thereof.

Fig. 4 is a fragmentary side elevation of parts shown in Fig. 3.

Figure 1:
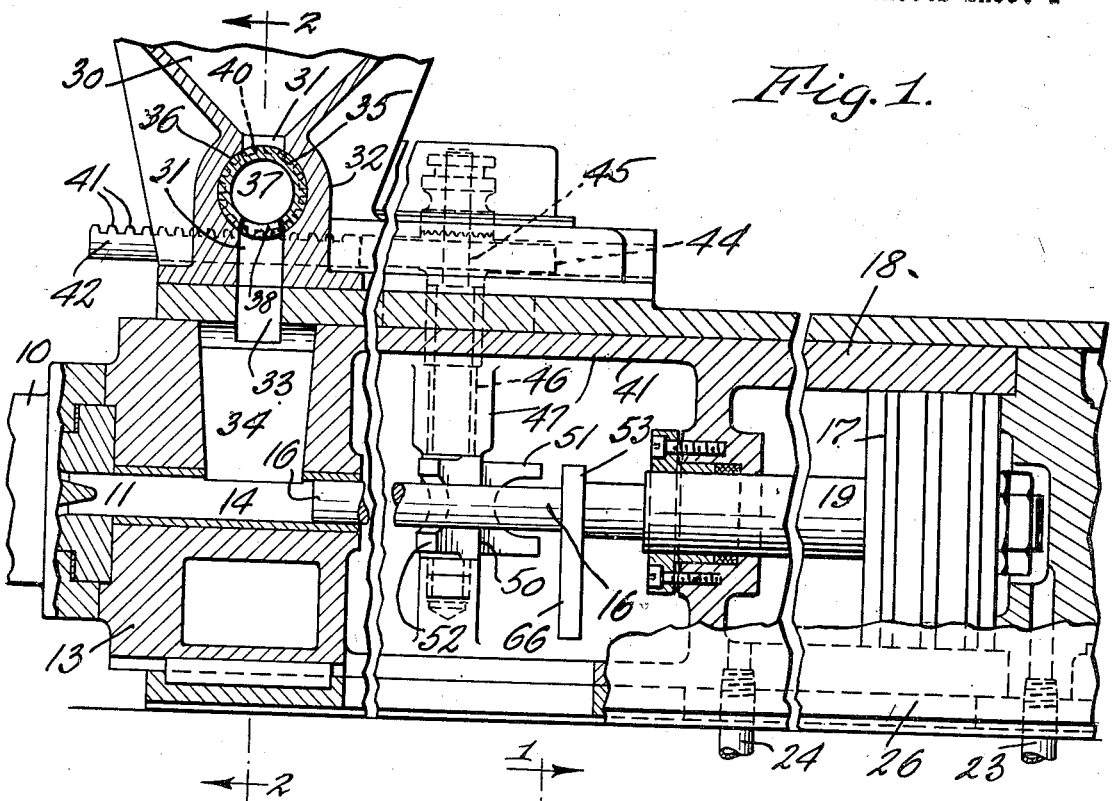
Fig. 1 is a fragmentary and broken side elevation, partly in vertical section, of a measuring and delivering mechanism for injection molding apparatus embodying my invention.

Except as regards the means, later described, for altering or regulating the volumes of the measured charges of material delivered to the injection plunger, the measuring and delivering mechanism may be of known or any suitable construction. As illustrated in the drawings, it is constructed as follows:

10 represents the usual heating device which is provided with a passage or passages 11 through which the material is forced by the injection plunger and in which the material is heated in any usual or suitable manner, so that in the course of its passage through the heating device, it is converted to the fluid or liquid condition in which it is injected into the mold or molds. As usual, the heating device is provided at its forward end with a nozzle (not shown), which is held or secured tightly against the mold for injecting the material into the mold.

Suitably secured to the receiving end of the heating device 10 is a body or structure 13 forming a plunger chamber 14 communicating and preferably alined with the receiving passage 11 of the heating device. An injection plunger 16 is arranged to reciprocate in this chamber for forcing successive charges of the material from the plunger chamber into the heating device passage and thus injecting charges of the liquefied material into the mold. The injection plunger 16 is reciprocated by a hydraulic or fluid-pressure-actuated motor which, as shown, comprises a piston 17 arranged to reciprocate in a cylinder 18 fixedly connected to or associated with the body 13 containing the plunger chamber. The injection plunger is suitably connected to the outer end of a piston rod 19 secured to the piston 17. The piston may be operated for reciprocating the injection plunger as by fluid pressure admitted to and exhausted from the cylinder at opposite sides of the piston through suitable pipes or connections 23, 24, in any usual or suitable manner. As illustrated, the plunger operating cylinder is secured within a stationary supporting frame 26. 30 indicates a feed hopper or receptacle for the divided solid material. As shown, this feed hopper is secured on top of the stationary frame 26 over the plunger chamber 14 and has downwardly converging walls and a bottom discharge opening or passage 31 extending vertically through a base portion 32 of the hopper. The hopper discharge passage 31 communicates through a hole 33 in the top of the stationary frame 26 with a passage 34, formed in the body 13, which communicates at its lower end with the plunger chamber 14, the passages or holes 31, 33 and 34, together forming the feed passage from the feed hopper to the plunger chamber.

A measuring device 35 is arranged to receive a charge of material from the hopper and, by movement of the measuring device, to discharge the same into the feed passage for delivery into the plunger chamber. Preferably the measuring device is of cylindrical form and arranged to oscillate in a cylindrical chamber 36 in the hopper base 32, intersecting the feed passage, and is provided with a central, longitudinal bore 37 and a connecting opening 38 in one side of the cylinder which together form a charge measuring pocket. When the measuring cylinder is turned so that the opening 38 faces upwardly, the material from the hopper will enter and fill the pocket and, by turning the measuring cylinder one-half of a revolution, the pocket will be inverted and discharge the charge of material into the feed passage 33—34.

The following mechanism is shown for oscillating or turning the measuring cylinder to thus receive and discharge the charges of material:

On one end of the measuring cylinder is formed or fixed a pinion 40 which meshes with rack teeth 41 on a rod or bar 42 arranged to slide endwise in a guide bore 43 extending parallel with the axis of the injection plunger in the hopper base 32. Rack bar 42 is also provided with teeth on one side thereof which mesh with a gear pinion 44 secured on a vertical shaft 45 journalled in a suitable bearing 46 on a stationary part 47 which may be an extension of the plunger operating cylinder. Keyed or fixed on this shaft is a rocker member 50 provided with two arms 51, 52, which project at an angle to each other for cooperation with a tappet member 53 which is movable with and may be secured to the injection plunger. In the position of the parts shown in Fig. 3 of the drawings, the rocker arm 51 occupies a position with its bifurcated outer end straddling the plunger in advance of the tappet 53. When the plunger is moved forwardly to inject material into the heating device, the tappet will engage and swing the arm 51, thereby rocking the shaft 45 and, through the rack and pinion mechanism, turning the measuring cylinder 35 approximately one-half of a revolution for placing the opening 38 of the measuring pocket in position to receive a charge of material from the hopper. This movement of the rocker arm 51 by the tappet 53, swings the other rocker arm 52 to a position in which its bifurcated end straddles the rod in rear of the tappet so that when the plunger is retracted, the tappet will engage the arm 52 and rock the shaft 45 in the opposite direction for reversely turning the measuring cylinder, so as to discharge the material from its pocket into the feed passage 33, 34. In said forward movement of the plunger, it will move across and shut off the lower end of the passage 34 and push forwardly the material which has been previously deposited in the plunger chamber, and when the plunger is retracted and the measuring pocket turned down, the charge of material will fall from the pocket into the plunger chamber, ready to be pushed forwardly to the heating device at the next advance movement of the plunger. The measuring device described could be operated to receive and drop the charges by other suitable mechanism.

For the purpose of varying or altering the volumes of the charges delivered by the measuring device to the plunger chamber, two adjustable plugs or members 55, 56 are preferably arranged in opposite ends of the pocket bore of the measuring cylinder so that the size of the measuring pocket formed between them can be changed by in and out adjustments of the plugs. One plug 55 may be adjusted manually, as by means of an adjusting screw 55a, for effecting coarse or large capacity changes in the charge pocket. This screw, as shown, is arranged to turn in a threaded hole in the end of the chamber containing the measuring cylinder, and can be turned by a handle applied to its outer end or otherwise, and can be secured in adjusted positions as by a lock nut 55b on the screw.

The other adjusting plug or member 56 is adjusted automatically outwardly or inwardly to alter the size of the charge pocket, preferably under control of, or in accordance with the extent of the forward or injection strokes of, the injection plunger.

The automatic mechanism, as shown in the drawings, for this purpose comprises a pressure-actuated plunger or device 57 working in a cylinder 58 and arranged to move the plug 56 inwardly, and a lever or device 59 which is connected to the plug 56 and is arranged to be actuated by the forward strokes of the injection plunger 16, to shift the adjusting plug 56 outwardly against the action of the pressure-actuated plunger 57. Plunger cylinder 58 is connected through a relief valve 60 by a pipe or passage 61, to the main or operating cylinder 18 for the injection plunger at the side of the piston 17 upon which the pressure acts to move the plunger forwardly. Connected in parallel with the relief valve 60 in the pressure line 61, is a check valve 62 which opens in a direction to permit discharge of pressure from the plunger cylinder 58. As shown, the lever 59 comprises two arms 59, 59' secured to opposite ends of a fulcrum pin or shaft 63 mounted in a suitable bearing 64 on the stationary frame, the forked end of lever arm 59 having a pin and slot connection 65 with the adjusting plug 56. The free end of the other lever arm 59' projects into the path of an actuating tappet or element 66 arranged to move with the injection plunger and during the forward stroke of the latter to engage said arm and move the lever so as to pull or shift the adjusting plug 56 outwardly. The lever actuating tappet 66 may be a rigid extension or part of the tappet 53 which operates the oscillating mechanism for the measuring cylinder.

The operation of this automatic mechanism for adjusting or altering the capacity of the charge measuring pocket may be described as follows:

Before the injection plunger reaches the end of its injection stroke, in fact as soon as it has contacted a new charge of loose material in the plunger chamber 14, the hydraulic pressure in cylinder 18 which acts to move the plunger forwardly, will build up to some necessary value in order to inject the material into the mold. As soon as this pressure rises the necessary amount, which for example, may be just a few hundred pounds, it will open the relief valve 60 and be admitted through the same into the plunger cylinder 58. This will move plunger 57 and shift the adjusting plug 56 inwardly or in a direction to reduce the volumetric capacity of the charge measuring pocket in the measuring cylinder 35. During this time, the measuring pocket will be turned downwardly and there will be no charge of material in the pocket. As the injection plunger travels forwardly on its injection stroke, the tappet 66 will engage the lever arm 59', and further motion of the tappet will swing the arm and the lever will pull or shift the adjusting plug 56 outwardly, or in a direction to increase the capacity of the measuring pocket. The injection plunger will eventually come to rest, which will definitely fix the location of the adjusting plug 56. The check valve 62 will open and relieve the pressure in the cylinder 58 on plunger 57 to permit this outward shifting of the adjusting plug 56 by the lever 59. Before the injection plunger can be retracted, the pressure in its operating cylinder 18 will have to drop to zero, which means that the pressure in the operating cylinder 58 which operates the adjusting plug 56, will drop to zero. Therefore, when the injection plunger and the tappet 66 are retracted, the lever 59 and the adjusting plug 56 will remain stationary, since there is no force exerted to move the plug inwardly. Since the position of the adjusting plug is then fixed according to the forward travel of the injection plunger, the charge taken in by the measuring pocket at the next operation of the apparatus will be determined by the final forward position of the injection plunger 16. If the injection plunger has to travel forwardly too far, it means that there has been a deficiency of material in the preceding charge delivered into the injection plunger chamber 14. This will cause the adjusting plug 56 to be pulled or shifted outwardly so as to increase the capacity of the measuring pocket and the pocket will receive a larger volume of material at the next shot. On the other hand, if the injection plunger has not traveled far enough on its forward or injection stroke, it will mean that there has been too much material charged into the injection plunger chamber and the adjusting plug 56 therefore will not be pulled or shifted outwardly so far, and the next succeeding charge in the measuring pocket will be decreased.

This device does not provide measured charges of constant volume. It does automatically compensate on succeeding operations for an undercharge or overcharge. It will prevent an accumulation of errors and, by correctly proportioning the diameter and stroke of the adjusting plug 56, the apparatus will always operate within certain limits of the forward stroke of the injection plunger. The actuating tappet or member 66 will hold the levers 59 against the opposing force exerted by the pressure actuated plunger 57. It may be repeated that the force exerted by this plunger 57 will be reduced to zero before the tappet 66 is retracted and leaves the lever and adjusting plug 56 free.

A stop 70 is shown in Figs. 3 and 4 to limit the inward adjustment of the plug 56. This stop is preferably made adjustable so that the extent to which the adjusting plug 56 can be moved inwardly or in the restricting direction, can be limited as desired. As shown, the stop 70 consists of a screw turning in a screw threaded socket on the main frame in position to be engaged by the lever arm 59. On every injection stroke of the injection plunger, the plug actuating plunger 57 will shift the adjusting plug inwardly as far as the stop 70 will allow it to move. It might be possible to operate the apparatus so that the adjusting plug will travel in far enough to completely close the charge pocket. The adjusting plug is first moved in on each stroke of the injection plunger and then adjusted out a predetermined amount by the plunger operated tappet 66 and lever 59. This movement is predetermined by the amount of the previous charge delivered to the injection plunger chamber.

Figure 2:
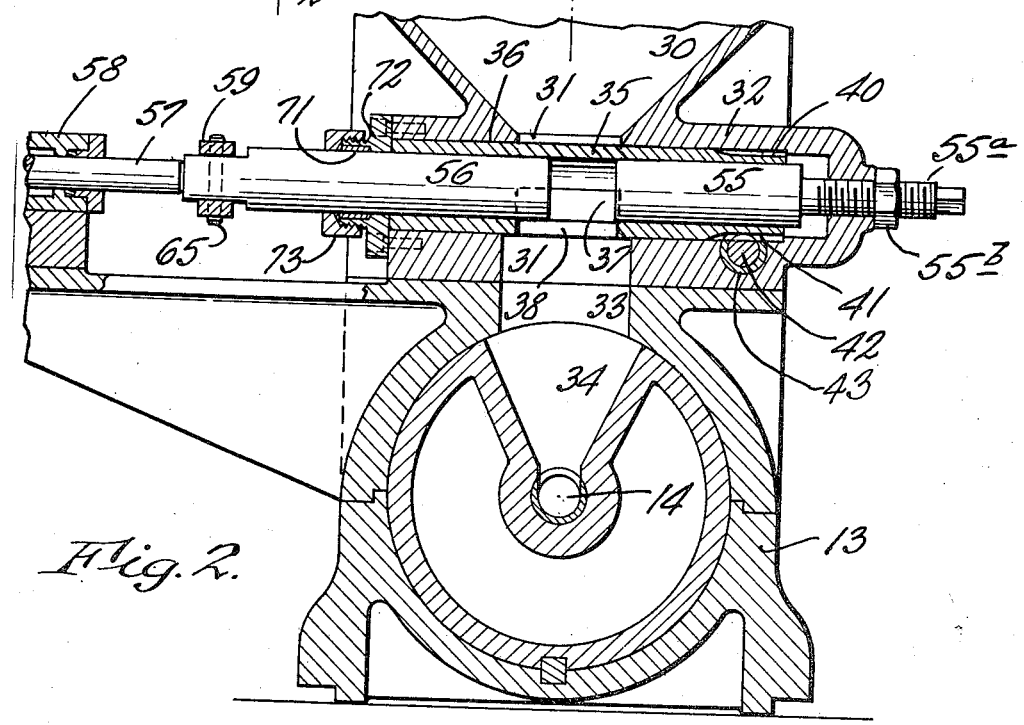
Fig. 2 is a transverse, sectional elevation thereof, on line 2—2, Fig. 1.

Provision is preferably made for preventing the adjusting plug from being accidentally shifted, as for example, by the vibration of the machine, or other unintentional cause. For this purpose, a packing ring 71 is shown in Fig. 2 surrounding the adjusting plug 56 in a packing box or container 72, and a gland or screw cap 73 is provided for compressing the friction ring to grip the adjusting plug with the necessary friction, to hold it stationary against movement, except by the action of its operating lever or plunger.

While the adjusting plug or member 55, adapted to be operated manually for effecting coarse capacity changes in the measuring pocket, is preferably employed in addition to the automatic adjusting plug or member 56, the automatic adjusting member could be employed alone, without the manually adjustable member, if preferred.

It will be obvious that various changes in the details and arrangement of parts, which have been herein described and illustrated in order to explain the nature of the invention, may be made by those skilled in the art within the principle and scope of the invention, as expressed in the appended claims.

I claim as my invention:

1. In a material measuring and delivering mechanism, a plunger chamber, a plunger therein, fluid-pressure-actuated means for reciprocating the plunger in the chamber for ejecting therefrom successive portions of material in the chamber, a movable measuring device having a measuring pocket therein for delivering measured charges of material to said plunger chamber before each advance stroke of the plunger, means operatingly connecting said measuring device to said plunger for movement thereby alternately to receive material and deliver a measured charge thereof to said chamber at different intervals in the movement of said plunger, means responsive to the fluid pressure causing an advance of said plunger for decreasing the size of said pocket to a minimum below the average required for each charge, and means responsive to the advance movement of said plunger for causing an enlargement of the size of said pocket from said minimum by an amount proportional to the extent of advance movement of said plunger.

2. In a material measuring and delivering mechanism, a plunger chamber, a plunger therein, fluid-pressure-actuated means for reciprocating the plunger in the chamber for ejecting therefrom successive portions of material in the chamber, a measuring device having a measuring pocket and operable to deliver a measured charge of the material into the plunger chamber before each advance stroke of the plunger, a device which is shiftable oppositely for varying the capacity of the measuring pocket, and operating means for said device constructed and arranged to shift said device in one direction by action of said plunger and in the opposite direction by the operating fluid pressure for the plunger to automatically vary the volumes of the charges delivered by the measuring device to the plunger chamber in accordance with variations in the advance movements of the plunger.

3. In a material measuring and delivering mechanism, a plunger which is reciprocated in a plunger chamber for ejecting therefrom successive portions of the material in the chamber, a measuring device having a charge measuring pocket and operable to deliver successive charges of the material measured by the pocket into the plunger chamber in advance of successive strokes of the plunger, a member adjustable for varying the capacity of said measuring pocket, and means constructed and arranged to act under control of the volume of a preceding charge in the plunger chamber for shifting said adjustable member to predetermine the volume of a succeeding charge delivered to the plunger chamber.

4. In a material measuring and delivering mechanism, a plunger which is reciprocated in a plunger chamber for ejecting therefrom successive portions of the material in the chamber, a measuring device having a charge measuring pocket and operable to deliver successive charges of the material measured by the pocket into the plunger chamber in advance of successive strokes of the plunger, a member adjustable for varying the capacity of said measuring pocket, and means actuated by said plunger under control of the volume of a preceding charge in the plunger chamber and constructed and arranged to shift said adjustable member to predetermine the volume of a succeeding charge delivered to the plunger chamber depending upon the volume of a preceding charge delivered to said chamber.

5. In a material measuring and delivering mechanism, a plunger which is reciprocated in a plunger chamber for ejecting therefrom successive portions of the material in the chamber, a measuring device having a charge measuring pocket and operable to deliver successive charges of the material measured by the pocket into the plunger chamber in advance of successive strokes of the plunger, a member adjustable for varying the capacity of said measuring pocket, and means constructed and arranged to act in accordance with advance movements of different lengths of the plunger for shifting said adjustable member different distances to predetermine the volumes of the charges delivered by the measuring device.

6. In a material measuring and delivering mechanism, a plunger which is reciprocated in a plunger chamber for ejecting therefrom successive portions of the material in the chamber, a measuring device having a charge measuring pocket and operable to deliver charges of the material measured by the pocket for delivery by said plunger, a member oppositely shiftable for restricting and enlarging said measuring pocket, pressure-actuated means for shifting said member in the restricting direction, means constructed and arranged to act under control of the motion of said plunger for shifting said member in the enlarging direction in opposition to said pressure-actuated means, and means for relieving the pressure on said pressure-actuated means to permit such shifting of said member in the enlarging direction.

7. In a material measuring and delivering mechanism, a plunger chamber, a plunger therein, a fluid-pressure-actuated motor for reciprocating said plunger for ejecting from the chamber portions of the material therein, a measuring device having a charge measuring pocket and operable to deliver successive charges of the material from the pocket into the plunger chamber, a member oppositely shiftable for restricting and enlarging said measuring pocket, a fluid-pressure-actuated device for shifting said adjustable member in the restricting direction, said device having operating pressure connections with said plunger-operating motor, means controlled by the ejecting movements of the plunger and constructed and arranged to shift said adjustable member in the enlarging direction in opposition to said pressure-actuated device, and means for relieving the pressure on said device to permit such shifting of said adjustable member in the enlarging direction.

8. In a material measuring and delivering mechanism, a plunger chamber, a plunger therein, a fluid-pressure-actuated motor for reciprocating said plunger for ejecting from the chamber portions of the material therein, a measuring device having a charge measuring pocket and operable to deliver successive charges of the material from the pocket into the plunger chamber, a member oppositely shiftable for restricting and enlarging said measuring pocket, a fluid-pressure-actuated device for shifting said adjustable member in the restricting direction, said device having operating pressure connections with said plunger operating motor, means controlled by the ejecting movements of the plunger and constructed and arranged to shift said adjustable member in the enlarging direction in opposition to said pressure actuated device, and pressure relief and check valves connected in parallel in said pressure connections, said check valve being arranged to open to permit such shifting of said adjustable member in the enlarging direction.

9. In a material measuring and delivering mechanism, a plunger chamber, a plunger therein, a fluid-pressure-actuated motor for reciprocating said plunger for ejecting from the chamber portions of the material therein, a measuring device having a charge measuring pocket and operable to deliver successive charges of the material from the pocket into the plunger chamber, a member oppositely shiftable for restricting and enlarging said measuring pocket, a fluid-pressure-actuated device for shifting said adjustable member in the restricting direction, means controlled by the ejecting movements of the plunger and constructed and arranged to shift said adjustable member in the enlarging direction in opposition to said pressure-actuated device, means for relieving the pressure on said pressure actuated device to permit such shifting of said adjustable member in the enlarging direction, and an adjustable stop for determining the restricting movement of said adjustable member.

10. In a material measuring and delivering mechanism, a plunger chamber, a plunger therein, a fluid-pressure-actuated motor for reciprocating said plunger for ejecting from the chamber portions of the material therein, a measuring device having a charge measuring pocket and operable to deliver successive charges of the material from the pocket into the plunger chamber, a member oppositely shiftable for restricting and enlarging said measuring pocket, a fluid-pressure-actuated device for shifting said adjustable member in the restricting direction, means controlled by the ejecting movements of the plunger and constructed and arranged to shift said adjustable member in the enlarging direction in opposition to said pressure-actuated device, means for relieving the pressure on said device to permit such shifting of said adjustable member in the enlarging direction, and means for holding said adjustable member against movement except by its said shifting means.

11. In a material measuring and delivering mechanism, a plunger which is reciprocated in a plunger chamber for ejecting therefrom successive portions of the material in the chamber, a measuring device operable by movements of constant extent to deliver a measured charge of the material into the chamber before each advance stroke of the plunger and having one part thereof adjustable relatively to another part of that device to vary its capacity for charges of the molding material, and means responsive to the extent of movement of the plunger in a charge delivering direction for causing an adjustment of said part and thereby a change in the volume of a subsequent charge delivered thereafter by the measuring device, the adjustment of said part acting to increase the volume of the charge delivered to said device upon an increase in the charge delivering movement of the plunger and to decrease such volume upon a decrease in the charge delivering movement of the plunger.

12. In a material measuring and delivering mechanism, a plunger which is reciprocated in a plunger chamber for ejecting therefrom successive portions of the material in the chamber, a measuring device having a charge receiving measuring pocket and operable to deliver a measured charge of the material into the chamber before each advance stroke of the plunger and having one part thereof adjustable relatively to another part of that device to vary its pocket capacity for the molding material, means operable automatically during and advance stroke of said plunger for moving said movable part into a position to restrict the capacity of said measuring pocket below the amount necessary for each charge of material, and means controlled by the movement of said plunger and operable automatically after movement of said part into said position for shifting said part in a direction to enlarge the capacity of said measuring pocket to an extent dependent upon the final position of said plunger.

13. In a material measuring and delivering mechanism, a plunger which is reciprocated in a plunger chamber for ejecting therefrom successive portions of the material in the chamber, a measuring device having a charge measuring pocket and operable to deliver a measured charge of the material into the chamber before each advance stroke of the plunger and having one part thereof adjustable relatively to another part of that device to vary its pocket capacity for the molding material, means operable by fluid pressure automatically during the initial portion of an advance stroke of said plunger for moving said movable part into a position to restrict the capacity of said measuring pocket below the amount necessary for each charge of material, means operable by said plunger during a subsequent portion of the same advance stroke thereof, for shifting said part in a direction to enlarge the capacity of said measuring pocket to an extent dependent upon the final position of said plunger, and means by which the fluid pressure on said first means during retraction of said plunger is relieved.

14. The improved method of measuring and delivering charges of molding material to an injection cylinder for movement by a reciprocating plunger into a mold, which comprises receiving the molding material into a measuring chamber, delivering the measured material to said cylinder for subsequent delivery to said mold by movement of said plunger, decreasing the size of said chamber prior to each reception of molding material below the capacity corresponding to that necessary to fill said mold each time, and then also before reception of said material increasing the size of said chamber to an extent dependent upon the final advanced position of said plunger when delivering a previously measured charge to said mold, whereby overcharges and undercharges may be compensated for.

15. A material measuring and delivering mechanism according to claim 4, which is also provided a manually adjustable member for varying the capacity of said charge measuring pocket.

16. In a measuring and delivering mechanism, a plunger chamber, a plunger therein, a fluid-pressure motor for reciprocating said plunger in the chamber for ejecting therefrom by advance strokes of the plunger successive portions of material delivered to the chamber, a measuring device operable to deliver a measured charge of the material into the plunger chamber before each advance stroke of the plunger, a member which is adjustable for varying the volumes of the charges delivered by said measuring device to the plunger chamber, a fluid-pressure motor for operating said adjustable member having a fluid pressure connection with said plunger-operating motor, whereby the operation of said member is responsive to the fluid pressure acting on said plunger-operating motor, and means controlled by the ejecting strokes of said plunger and acting to adjust said member in opposition to its movement by its fluid pressure motor.

THOMAS F. STACY.